United States Patent

Bergholz et al.

[11] Patent Number: 5,812,067
[45] Date of Patent: Sep. 22, 1998

[54] SYSTEM FOR RECOGNIZING AUTHORIZATION TO USE A VEHICLE

[75] Inventors: Ralf Bergholz, Braunschweig; Hubert Weisser, Lehre; Thomas Zielke, Bochum, all of Germany

[73] Assignee: Volkswagen AG, Wolfsburg, Germany

[21] Appl. No.: 709,607

[22] Filed: Sep. 9, 1996

Related U.S. Application Data

[63] Continuation of Ser. No. 433,611, May 3, 1995, abandoned.

[30] Foreign Application Priority Data

May 10, 1994 [DE] Germany .................. 44 16 507.2

[51] Int. Cl.$^6$ .................................................. H04Q 1/00
[52] U.S. Cl. .................. 340/825.31; 340/825.34; 340/426; 307/10.2; 180/257
[58] Field of Search ................ 340/825.31, 825.34, 340/425.5, 426; 180/257, 287; 307/10.1; 382/115, 117, 118

[56] References Cited

U.S. PATENT DOCUMENTS

| | | |
|---|---|---|
| 4,449,189 | 5/1984 | Feix et al. .......................... 382/118 X |
| 4,450,545 | 5/1984 | Kishi et al. .............................. 367/198 |
| 4,754,255 | 6/1988 | Sanders et al. ................. 340/825.31 X |
| 4,856,072 | 8/1989 | Schneider et al. ............. 340/825.31 X |
| 4,993,068 | 2/1991 | Piosenka et al. .............. 340/825.34 X |
| 5,012,522 | 4/1991 | Lambert ................................. 382/118 |
| 5,204,672 | 4/1993 | Brooks ........................... 340/825.31 X |
| 5,283,644 | 2/1994 | Maeno .................................. 382/118 X |
| 5,557,254 | 9/1996 | Johnson et al. .......................... 340/426 |

FOREIGN PATENT DOCUMENTS

| | | |
|---|---|---|
| 3047201 | 6/1982 | Germany . |
| 3447033 | 7/1986 | Germany . |
| 3743856 | 7/1989 | Germany . |
| 4137213 | 5/1993 | Germany . |
| 4142026 | 6/1993 | Germany . |

*Primary Examiner*—Edwin C. Holloway, III
*Attorney, Agent, or Firm*—Baker & Botts, L.L.P.

[57] ABSTRACT

A system for recognizing authorization of a person to use a vehicle includes an optical-electronic image processor arranged to identify an authorized user of the vehicle by recognizing a distinctive physical feature of the user. The image processor provides an output signal which controls locking functions relating to operation of the vehicle based on a comparison of detected information with stored information relating to distinctive individual features of authorized users so that only authorized persons are enabled to use the vehicle.

20 Claims, 1 Drawing Sheet

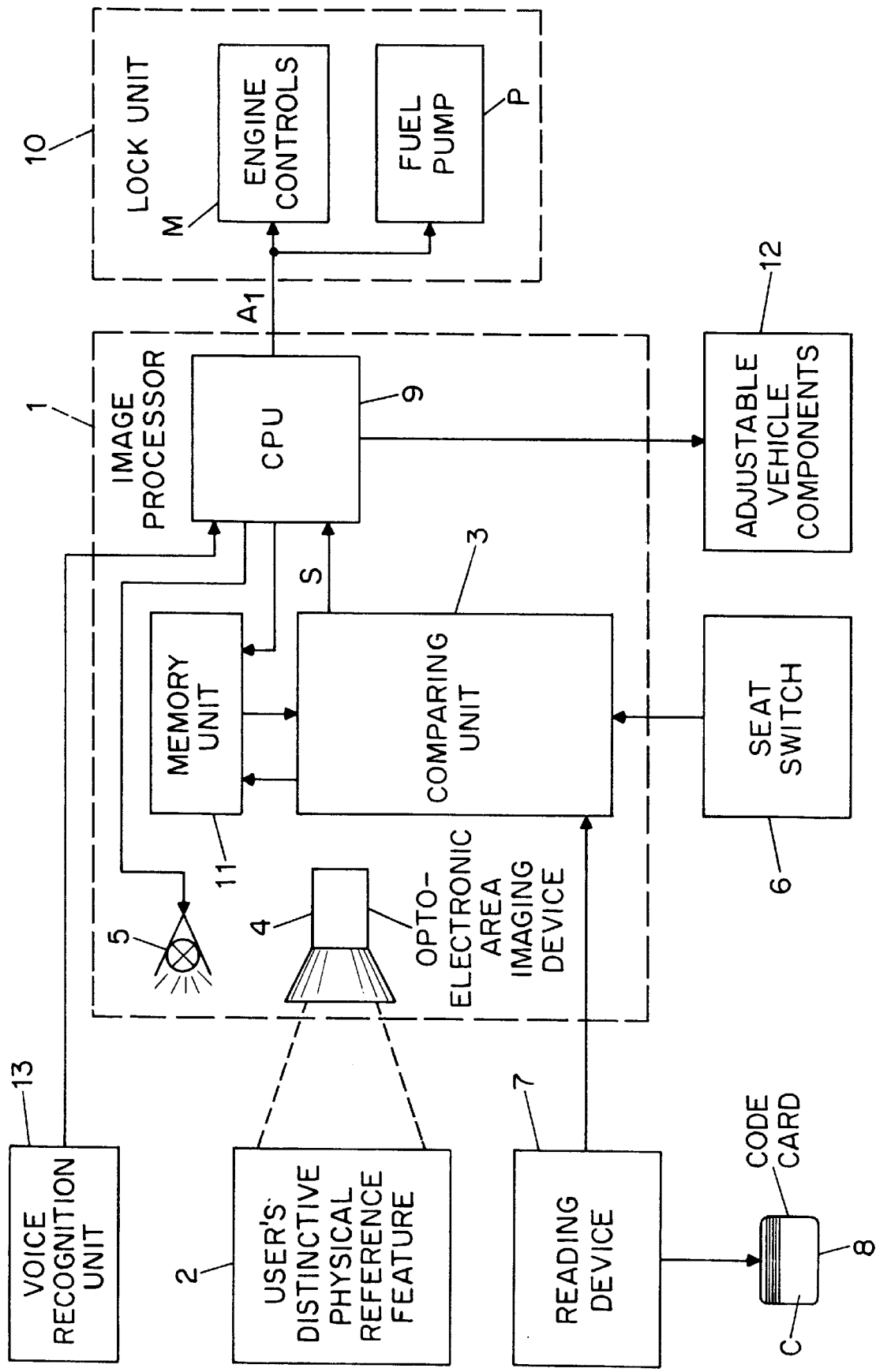

SYSTEM FOR RECOGNIZING AUTHORIZATION TO USE A VEHICLE

This application is a continuation of application Ser. No. 08/433,611 filed on May 3, 1995, now abandoned.

BACKGROUND OF THE INVENTION

This invention relates to systems for recognizing authorization to use a vehicle which include an optical-electronic image processor to identify a vehicle user.

Conventional antitheft systems for vehicles utilize a mechanical or electronic key arranged to recognize, by opening of a vehicle door, whether the user of the key is authorized to use the vehicle. In these systems, however, problems can result from theft or loss of the key. Another disadvantage of these systems is that unauthorized persons having duplicate keys can gain access to the vehicle without damaging it and can thus misappropriate the vehicle.

To overcome this disadvantage, German Offenlegungsschrift No. 37 43 856 discloses a control arrangement for locking and unlocking a security system for motor vehicles. According to that disclosure, the key for opening the doors or activating the ignition of the vehicle is replaced by a detector which detects application or exhibition of a finger or fingerprint to a window, and an associated electronic evaluation system connecting to the vehicle locking device determines the dactyloscopic authenticity of the impression. Such an evaluation system is comparatively secure, but has the disadvantage that, once the vehicle door has been opened, theft of the vehicle becomes a simple matter.

SUMMARY OF THE INVENTION

Accordingly, it is an object of the present invention to provide a system for detecting authorization to use a vehicle which overcomes the disadvantages of the prior art.

Another object of the invention is to provide a system for determining authorized use of a motor vehicle that allows only authorized persons to use the vehicle and prevents misappropriation of the vehicle, even after a brief stop, for example, at an intersection.

These and other objects of the invention are attained by providing a system in which an optical-electronic image processor is arranged to recognize an authorized user of a vehicle based on a distinctive physical feature and to control one or more locking functions in the vehicle in accordance with such recognition.

According to the invention, an optical-electronic image processor produces an output signal which releases vehicle operation locking functions to permit operation of the motor vehicle when it recognizes an authorized vehicle user. In one embodiment of the invention, to identify authorization to operate the vehicle, a comparison device is provided for comparing at least one distinctive physical feature of a potential user of the vehicle with at least one stored reference feature of an authorized user, the reference feature being stored when an identification code is supplied to the system, for example, by inserting a code card.

According to a particular aspect of the invention, the identification code contains characteristic data with respect to the use authorization or special vehicle data. Thus, it is possible, in the case of a rental vehicle, for example, to limit the authorization to a given period of time or for a repair shop to make vehicle-specific information available for repair purposes in addition to authorizing use of the vehicle.

A preferred image processor includes an opto-electronic area image sensor and, to enhance security of identification, the system may include a light source, preferably in the near-infrared spectrum to avoid dazzling the vehicle user.

According to another embodiment of the invention, when use authorization has been recognized, and in accordance with a personal identification signal, stored personal comfort adjustments, such as the adjustment of seat positions and mirror settings, can be carried out.

In one embodiment of the invention, it is possible to perform a personalized monitoring and control of ambient conditions in the vehicle while in motion as a function of the personal identification signal, providing improved driving safety.

In the case of a parked vehicle, the image processor may be arranged to monitor the interior of the vehicle for the presence of an unauthorized user and to generate control signals for alarm devices.

According to another aspect of the invention, if the system is not arranged to operate continuously in order to save energy, then the image processor is activated only when the presence of a person in the driver's seat is detected. Such detection is advantageously effected by a seat sensor within the driver's seat. This has the important advantage that misappropriation of the vehicle by another driver during a stop, for example, at a traffic light, can be prevented. In the event of a change of drivers, the change is detected in the driver's seat and the image processor is reactivated, generating an identification signal. If an unauthorized person is identified, the vehicle locking functions are activated and the vehicle cannot be operated.

According to another embodiment of the invention, identification of the operator by voice is provided as a supplement to optical recognition of a distinctive physical feature as authorization for use of the vehicle.

BRIEF DESCRIPTION OF THE DRAWING

Further objects and advantages of the invention will be apparent from a reading of the following description in conjunction with the accompanying DRAWING, which is a schematic block diagram illustrating a representative embodiment of a system for recognizing authorization of a person to use a vehicle in accordance with the invention.

DESCRIPTION OF PREFERRED EMBODIMENTS

In the typical embodiment of the invention shown in the drawing, an image processor 1 includes an opto-electronic area image sensor 4, such as a CCD camera, arranged to produce images of one or more schematically-illustrated distinctive physical features 2 of a person located in a driver's seat in a vehicle. Suitable distinctive physical features may be the face of the person or one or more parts thereof or, alternatively, a fingerprint. Optimally, the distinctive physical features may be illuminated by a light source 5, preferably emitting in the near-infrared part of the spectrum to enhance reliability of identification and avoid dazzling the subject. A comparison unit 3 compares the images taken by the sensor 4 with corresponding reference features of persons authorized to use the vehicle which have been recorded in a memory unit 11.

For each authorized user, information relating to the distinctive physical reference features is stored under the control of a central processing unit 9 in the memory unit 11 on the occasion of first use of the system by the authorized person. For this purpose, an identifying code C is entered into a reading device 7 by a code card 8. If the card contains a valid identification code C, data relating to the distinctive physical features 2 of the person as detected by the opto-electronic area image sensor 4 are stored in the memory unit 11 as physical feature reference information. By appropriate presentation of a physical feature 2 to the opto-electronic area image sensor, an authorized user of the vehicle has a choice of which specific distinctive physical feature he intends to use as an authorization reference. In addition to the general vehicle use authorization, the code card 8 may include additional information about the duration and manner of authorized use or else vehicle-specific data. In response to detection of a valid identification code, the additional data are also stored in the memory unit 11 of the system.

The identification code contained in the card 8 is required only on the occasion of the first use by the authorized user or the first use in an authorized use cycle since authorization will thereafter be based on recognition of the selected distinctive physical feature. In other words, the code card 8 need not be carried for each access to the vehicle.

According to another arrangement, images or information relating to the distinctive physical reference features of the authorized user may be previously recorded on the code card 8 and be transferred from the card into the memory 11. For this purpose, the card may then be held in front of the opto-electronic area image sensor 4, and the comparison unit 3, by reference to control codes also included on the card, recognizes that the displayed physical reference feature information is to be recorded and stores corresponding data in the memory. As in the previously-described arrangement, repeated use of the code card is not necessary since the image processor detects one or more distinctive physical features of the user in order to identify the person as authorized.

When the authorized user thereafter intends to use the vehicle, the comparison unit 3, after checking the data relating to the distinctive physical features 2 against the stored reference data, transmits a signal S to the central processing unit 9, which in turn generates control signals $A_1$ for selected locking functions in a lock unit 10 of the vehicle, depending on the con tent of the signal S. If the use is authorized, the selected locking functions of the vehicle, such as the interruption of fuel supply to the fuel pump P and the deactivation of engine controls M, are overridden.

Thus, by providing an authorization recognition system according to the invention, unauthorized use of a vehicle can be entirely precluded even if entry into the vehicle has been obtained.

Continued vehicle-use authorization by an authorized user is maintained in the described embodiment by continued actuation of the seat switch 6 in the driver's seat. After a change of drivers during a brief pause at a traffic light or intersection, continued use of the vehicle without further authorization recognition can be precluded, thereby preventing a so-called "carnapping".

In addition to confirming a user's authorization to use the vehicle, the system may also be arranged to control adjustments of vehicle components 12, such as the seat or mirror, according to the authorized user's personal preference by supplying further signals $A_2$ to the adjustable vehicle components. For this purpose, the desired vehicle component settings selected by the authorized user during the first use by that user are stored in the memory unit 11 and automatically restored when that person uses the vehicle again.

To supplement the information relating to distinctive physical reference features 2 detected by the opto-electronic area image sensor 4, the system may also include a voice recognition unit 13 arranged to detect and recognize the voice of an authorized user and supply a corresponding signal to the image processing unit 1.

It will be understood that the structure and operation of the basic components of the system, i.e., the opto-electronic area image sensor 4, the central processing unit 9, the comparison unit 3, the memory unit 11, the card-reading device 7, the seat switch 6, the adjustable vehicle components 12, the voice recognition unit 13 and the lock controls provided in the lock unit 10 are conventional and well known to those skilled in the art, and therefore are not described in detail herein.

Although the invention has been described herein with reference to specific embodiments, many modifications and variations therein will readily occur to those skilled in the art. Accordingly, all such variations and modifications are included within the intended scope of the invention.

We claim:

1. A self-contained system for recognizing authorization of a user to use a motor vehicle comprising memory means in the motor vehicle, optical-electronic image processing means arranged to recognize an authorized user of a motor vehicle by automatic optoelectronic detection of a distinctive physical reference feature of a user positioned at a predetermined location within the motor vehicle based on information relating to the distinctive physical reference feature of an authorized user stored in the memory means in the motor vehicle, the recognition being effected without requiring action by the user other than being positioned at the predetermined location, and control means in the motor vehicle responsive to recognition or lack of recognition of an authorized user for controlling a locking function relating to operation of the motor vehicle.

2. A system according to claim 1 including means for entering an identification code to permit storing of information relating to a distinctive physical reference feature of an authorized user in the memory means.

3. A system according to claim 2 wherein the identification code includes information relating to the limitations on use of the vehicle by the authorized user.

4. A system according to claim 2 wherein the identification code includes information relating to settings of variable components of the vehicle.

5. A system according to claim 1 wherein the image processing means is arranged to identify an authorized user of the vehicle based on at least one physical feature of the user's head.

6. A system according to claim 1 wherein the image processing means comprises an opto-electronic image area sensor.

7. A system according to claim 6 wherein the image processing means comprises a light source to enhance reliability of recognition of an authorized user.

8. A system according to claim 1 including means for making adjustments of vehicle components according to personal convenience information included in an identification code.

9. A system according to claim 1 including means for monitoring an authorized user's physical condition according to information included in an identification code.

10. A system according to claim 1 wherein the image processing means includes means for generating signals for monitoring the interior of the vehicle.

11. A system according to claim 1 including detecting means for activating the image processing means upon detection of a person in the driver's seat.

12. A system according to claim 11 wherein the detecting means comprises a seat switch for detection of a person in the driver's seat.

13. A self-contained system for recognizing authorization of a user to use a motor vehicle comprising memory means in the motor vehicle, optical-electronic image processing means arranged to recognize an authorized user of a motor vehicle by automatic optoelectronic detection of a distinctive physical reference feature of a user positioned at a predetermined location within the motor vehicle based on information relating to the distinctive physical reference feature of an authorized user stored in the memory means in the motor vehicle and providing a corresponding physical reference feature recognition signal, the recognition of the distinctive physical reference feature being effected without requiring action by the user other than being positioned at the predetermined location, voice recognition means for recognizing the voice of an authorized user of the motor vehicle and providing a corresponding voice recognition signal, and control means responsive to recognition or lack of recognition of an authorized user as represented by at least one of the physical feature recognition signal and the voice recognition signal for controlling a locking function relating to operation of the vehicle.

14. A method for recognizing authorization to use a vehicle comprising storing in a memory unit of a self-contained recognition system in the vehicle information based on at least one distinctive physical reference feature of an authorized user of the vehicle, automatically detecting information relating to at least one distinctive physical reference feature of an intended user of the vehicle positioned at a predetermined location in the vehicle using an optical-electronic image processor in the self-contained recognition system in the vehicle, the detection being effected without requiring action by the user other than being positioned at the predetermined location in the vehicle, comparing in a comparing unit in the self-contained recognition system in the vehicle the detected physical reference information with the information stored in the memory unit in the vehicle relating to distinctive physical reference features of authorized users, and controlling locking functions relating to operation of the vehicle in accordance with the result of the comparison.

15. A method according to claim 14 including the step of entering an identification code to initiate the storing of information relating to a distinctive physical reference feature of an authorized user into a memory means.

16. A method according to claim 15 including providing information relating to use of the vehicle by the authorized user in the identification code.

17. A method according to claim 15 including providing information relating to settings of variable components of the vehicle in the identification code.

18. A method according to claim 15 including providing information in the identification code relating to personal convenience adjustments of the vehicle for an authorized user.

19. A method according to claim 15 including monitoring the physical condition of a user according to information provided by an identification code.

20. A method for recognizing authorization to use a vehicle comprising storing in a memory unit of a self-contained recognition system in the vehicle information based on at least one distinctive physical reference feature of an authorized user of the vehicle, storing information relating to the voice of an authorized user, automatically detecting information relating to at least one distinctive physical reference feature of an intended user of a vehicle positioned at a predetermined location in the vehicle using an optical-electronic image processor in the self-contained recognition system in the vehicle, the detection of the distinctive physical reference feature being effected without requiring action by the user other than being positioned at the predetermined location in the vehicle, comparing in a comparing unit in the self-contained recognition system in the vehicle the detected physical reference information with the information stored in the memory unit in the vehicle relating to distinctive physical reference features of authorized users and providing a corresponding physical reference feature recognition signal, detecting the voice of an authorized user of the vehicle and comparing the detected voice information with the stored authorized user voice information and providing a corresponding voice recognition signal, and controlling locking functions relating to operation of the vehicle in accordance with at least one of the physical reference feature recognition signal and the voice recognition signal.

\* \* \* \* \*

UNITED STATES PATENT AND TRADEMARK OFFICE
CERTIFICATE OF CORRECTION

PATENT NO. : 5,812,067
DATED : September 22, 1998
INVENTOR(S) : Berghotz et al.

It is certified that error appears in the above-identified patent and that said Letters Patent is hereby corrected as shown below:

<u>Title page,</u>
Item [73], Assignee, "Volkswagon AG," should read -- Volkswagon AG and C-VIS Gmbh --

Signed and Sealed this

Fifth Day of November, 2002

*Attest:*

JAMES E. ROGAN
*Attesting Officer*     *Director of the United States Patent and Trademark Office*